United States Patent [19]

Mihich

[11] Patent Number: 4,953,932
[45] Date of Patent: Sep. 4, 1990

[54] OPTICAL SLIP RING

[75] Inventor: Alexander Mihich, Manhattan Beach, Calif.

[73] Assignee: Hughes Aircraft Company, Los Angeles, Calif.

[21] Appl. No.: 343,754

[22] Filed: Apr. 25, 1989

[51] Int. Cl.⁵ .................................................. G02B 6/26
[52] U.S. Cl. ................................ 350/96.15; 350/96.20
[58] Field of Search .............. 350/96.15, 96.20, 96.21, 350/96.22; 250/227

[56] References Cited

U.S. PATENT DOCUMENTS

| | | | |
|---|---|---|---|
| 4,109,997 | 8/1978 | Iverson | 350/96.15 X |
| 4,466,695 | 8/1984 | Kruger | 350/96.20 |
| 4,492,427 | 1/1985 | Lewis et al. | 350/96.20 |
| 4,791,293 | 12/1988 | Barriere | 350/96.20 X |
| 4,818,860 | 4/1989 | Hasegawa | 250/227 |

FOREIGN PATENT DOCUMENTS 59-46612  3/1984  Japan ................ 350/96.22

OTHER PUBLICATIONS

Henderson et al., "A Fiber Optic Rotational Coupler", *Electron Components Conc*, Arlington, Va. (U.S.A.), May 1977, pp. 557–560.

*Primary Examiner*—John D. Lee
*Attorney, Agent, or Firm*—Robert A. Westerlund; Steven M. Mitchell; W. K. Denson-Low

[57] ABSTRACT

An improved optical slip ring is disclosed in which optical fibers are arranged in a predetermined pattern to transfer light energy from a non-rotating body to a rotating body. The optical slip ring of the present invention provides a predictable correlation between position and optical coupling. The invention 15 includes a first support 22 for a first plurality of optical fibers 20 arranged in a predetermined pattern around a radial axis. The invention 15 includes a second support 26 for a second plurality of optical fibers 24 arranged in a predetermined pattern around the same radial axis. In the illustrative embodiment, the first and second supports 22 and 26 are arranged so that the open ends of the first and second patterns of optical fibers are in face-to-face relation. Light energy transmitted through the open ends of the first plurality of optical fibers 20 is then received through the open ends of the second plurality of optical fibers 24 across a small gap. The arrangement of the first and second pluralities of optical fibers in a predetermined pattern provides an optimal alignment of the individual optical fibers of the first and second pluralities of optical fibers with respect to one another. This, in turn, facilitates a predictable correlation between the relative position of the first and second supports 22 and 26 and the optical coupling therebetween.

17 Claims, 4 Drawing Sheets

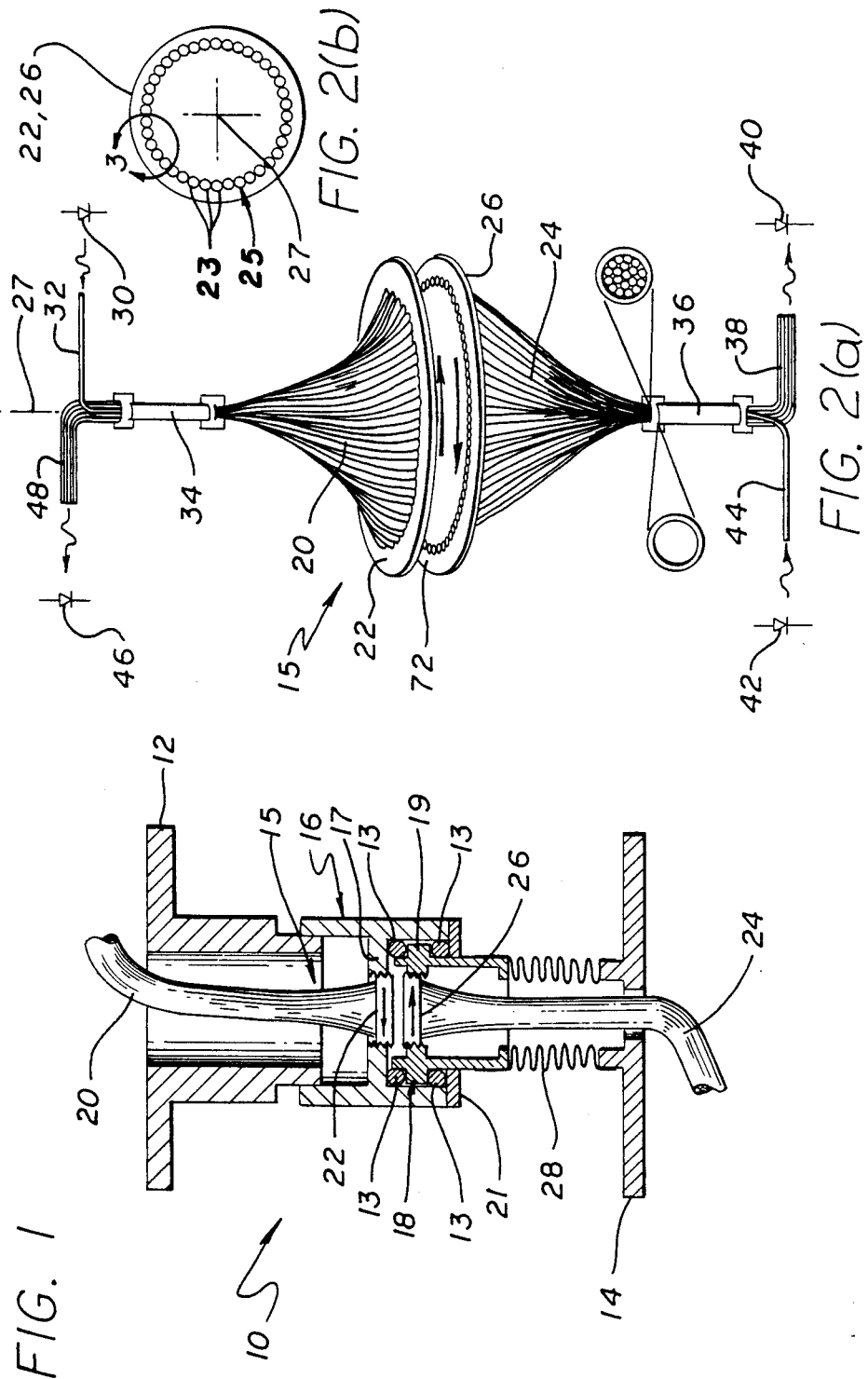

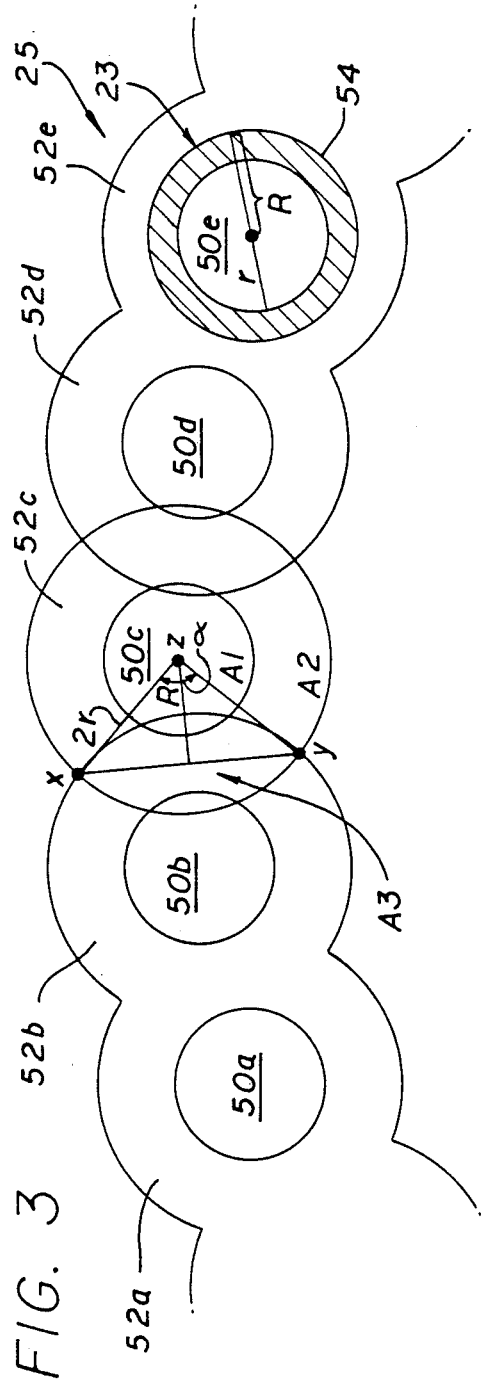
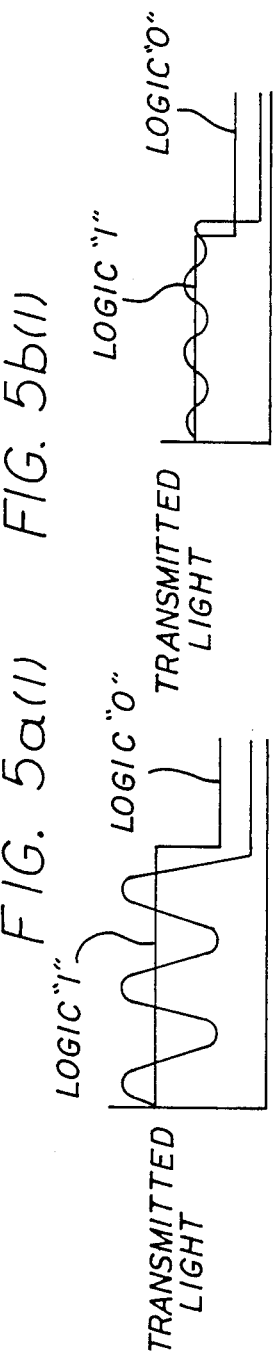
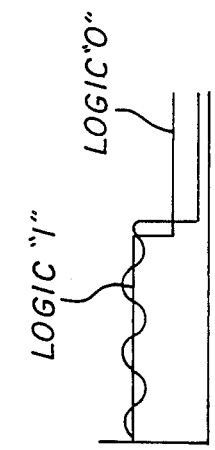
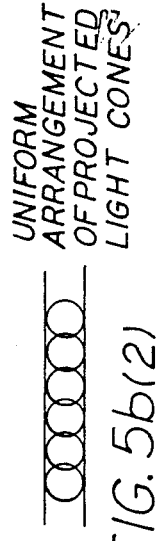
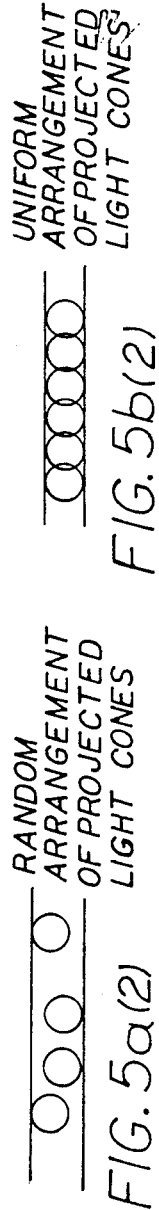

OPTICAL SLIP RING

BACKGROUND OF THE INVENTION

1. Field of the Invention:

The present invention relates to slip rings for transferring signals from a rotating body to a non-rotating body. More specifically, the present invention relates to optical slip rings.

While the present invention is described herein with reference to an illustrative embodiment for a particular application, it is understood that the invention is not limited thereto. Those having ordinary skill in the art and access to the teachings provided herein will recognize additional modifications, applications and embodiments within the scope of the present invention.

2. Description of the Related Art:

Many applications require the transmission of electrical power or signals across rotary joints. Traditionally, this function has been accomplished with mechanical slip rings. Mechanical slip rings transfer electric current from a rotating body to a non-rotating body by means of brushes attached to one body which contact a conducting ring on the other body. Unfortunately, mechanical slip rings are subject to wear, generate electrical noise and are susceptible to electromagnetic interference such as that induced by nuclear explosion.

The recent advent of fiber optic technology has led to the creation of fiber optic slip rings which solve many of the problems associated with mechanical slip rings. In place of an electrical connection, fiber optic cables are used to transfer light energy between a rotating body and a non-rotating body. U.S. Pat. No. 4,109,997, issued to M. Iverson on Feb. 28, 1977 discloses a typical conventional fiber optic slip ring. The slip ring consists of two opposing faceplates, each containing bundles of fiber optic cables. The fiber optic cables have open ends which are formed into rings terminating on the supporting faceplates. Light energy projected from the open ends of the fiber optic cables mounted on one faceplate are received by the open ends of the optic fibers mounted on the opposing faceplate, even as the two faceplates rotate with respect to one another.

Unfortunately, the magnitude of the energy transferred faceplates will vary randomly as the faceplates rotate with respect to each other. As a result, the random arrangement of the fibers within the rings precludes an accurate prediction of the fluctuations in the magnitude of the energy transferred between the faceplates as a function of the relative position of the two bodies.

Accordingly, there is a need in the art for a lightweight optical fiber slip ring which affords a predictable correlation between the relative position of two counter-rotating bodies and the optical coupling therebetween.

SUMMARY OF THE INVENTION

The need in the art is addressed by the improved optical slip ring of the present invention in which optical fibers are arranged in a predetermined pattern to transfer light energy from a non-rotating body to a rotating body. The optical slip ring of the present invention provides a predictable correlation between position and optical coupling. The invention includes a first support for a first plurality of optical fibers arranged in a predetermined pattern around a radial axis. The invention includes a second support for a second plurality of optical fibers arranged in a predetermined pattern around the same radial axis. In the illustrative embodiment, the first and second supports are arranged so that the open ends of the first and second patterns of optical fibers are in face-to-face relation. Light energy transmitted through the open ends of the first plurality of optical fibers is then received through the open ends of the second plurality of optical fibers across a small gap. The arrangement of the first and second pluralities of optical fibers in a predetermined pattern provides an optimal alignment of the individual optical fibers of the first and second pluralities of optical fibers with respect to one another. This, in turn, facilitates a predictable correlation between the relative position of the first and second supports and the optical coupling therebetween.

BRIEF DESCRIPTION OF THE DRAWINGS

FIG. 1 is a sectional side view of an illustrative embodiment of a slip ring assembly incorporating the optical slip ring of the present invention.

FIG. 2a is a simplified perspective view which illustrates the arrangement of the optical fibers attached to the opposing faceplates of the optical slip ring of the present invention.

FIG. 2b is a simplified frontal view of the opposing faceplates which illustrates the arrangement of the optical fibers in a circular pattern centered about a common radial axis.

FIG. 3 illustrates the radiated light cones which are emitted by a first set of optical fibers and received by a second set of optical fibers.

FIG. 5a(1) is a graph illustrating the light transmission characteristics of a typical conventional fiber optic slip ring.

FIG. 5a(2) shows the random arrangement of projected light cones resulting from the random arrangement of optic fibers of a typical conventional fiber optic slip ring.

FIG. 5b(1) is a graph illustrating the light transmission characteristics of the fiber optic slip ring of the present invention.

FIG. 5b(2) shows the uniform arrangement of projected light cones resulting from the uniform arrangement of optic fibers of the fiber optic slip ring of the present invention.

DESCRIPTION OF THE INVENTION

Figure 4:
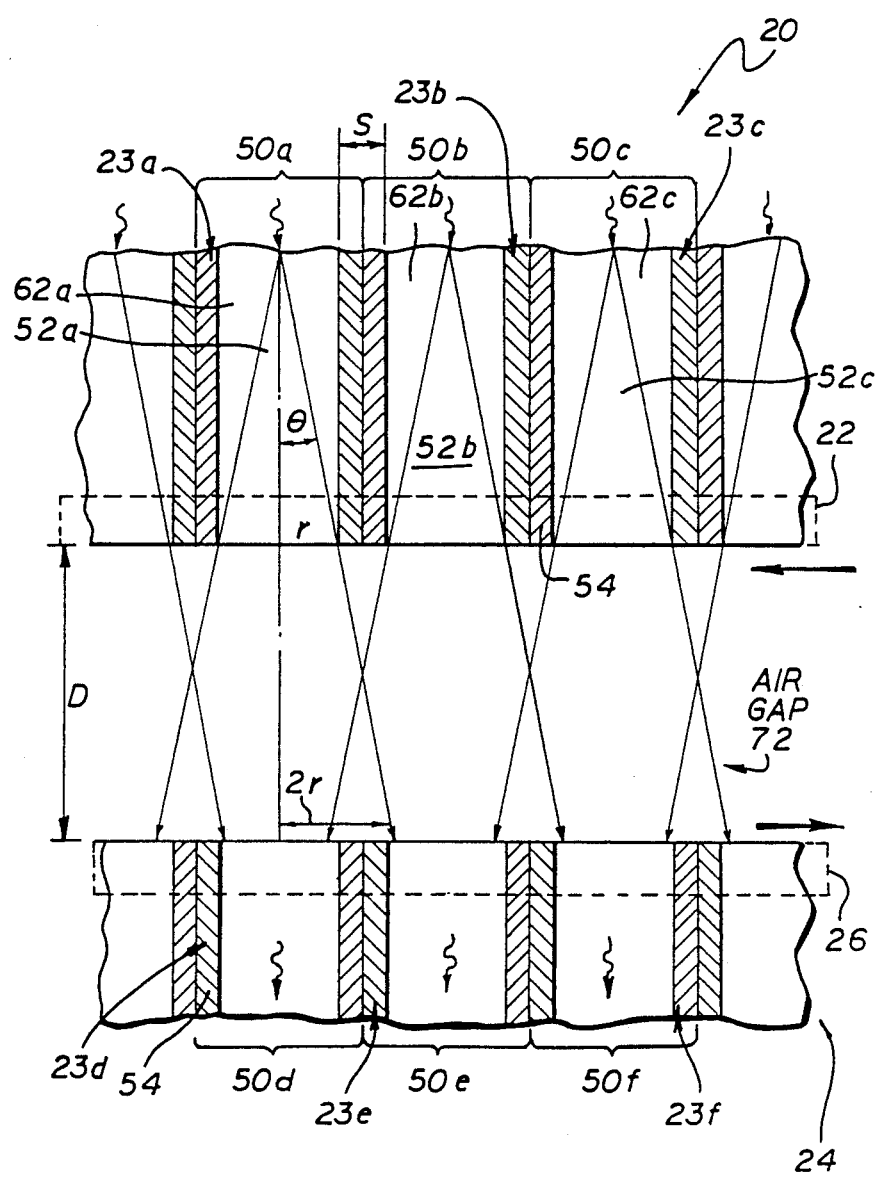
FIG. 4 is a diagrammatic sectional side view representative of the overlapped conical rings of light projected onto the receiving fibers by the transmitting optical fibers of the optical slip ring of the present invention.

FIG. 1 is a sectional side view of an illustrative embodiment of a slip ring assembly 10 incorporating the optical slip ring 15 of the present invention. The optical slip ring assembly 10 couples light energy between a non-rotating (despun) section 12 and rotating (spun) section 14 of a spin-stabilized satellite (not shown). The optical slip ring 15 of the present invention is retained within an outer housing shell 16 and an inner housing shell 18 of the assembly 10. The inner housing shell 18 rotates within the outer housing shell 16 on a set of ball bearings 13. The ball bearings 13 are retained between annular rims 17 and 21 of the other housing shell 16 and an annular rim 19 of the inner housing shell 18.

The optical slip ring 15 includes a first bundle 20 of optical fibers 23 supported by a first faceplate 22 and a second bundle 24 of optical fibers 23 supported by a second faceplate 26. In the illustrative embodiment, the first faceplate 22 is threaded and screwed in the inner rim 17 of the outer housing shell 16. The second faceplate 26 is threaded and screwed into the inner rim 19 of the inner housing shell 18. The invention is not limited to the manner by which the faceplates are attached to the rotating bodies. Those skilled in the art will recognize additional mounting arrangements within the scope of the invention. The mounting arrangement of the faceplates is such that the places the first and second faceplates 22 and 26 are aligned in face-to-face relation. This arrangement allows the faceplates 22 and 26 to rotate around a common radial axis 27 (not shown) extending through the respective centers thereof.

The outer housing shell 16 is attached to the despun section 12 of the satellite by adhesives, welds, screws or bolts or other suitable means. The inner housing shell 18 is attached to the spun section 14 of the satellite by a flex coupling joint 28. The flex coupling joint 28 insures that relative movement of the despun and spun sections 12 and 14 of the satellite along and outside a shared radial axis will not disturb the alignment of the first and second faceplates 22, 26. The flex coupling joint 28 can be attached to the inner housing shell 18 and the spun section of the satellite 14 with adhesives, welds, screws or bolts. Both the inner housing shell 18 and the outer housing shell 16 can be constructed of metal or other suitable material. The first and second faceplates 22, 26 can be constructed of metal, a light absorbing material such as glass or plastic, or other suitable material.

FIG. 2a is a simplified perspective view which illustrates the arrangement of the optical fibers of the opposing faceplates of the optical slip ring is of the present invention. As shown in FIG. 2a, the open ends of the first bundle 20 of optical fibers 23 are terminated in the first faceplate 22. The open ends of the second bundle 24 of optical fibers 23 are terminated in the second faceplate 26.

FIG. 2b is a frontal view of the first and second faceplates 22 and 26. As shown in FIG. 2b, the open ends of both the first and second bundles 20 and 24 of optical fibers 23 are arranged in circular patterns or rings 25 of equal diameter, centered around the common radial axis 27. The circular patterns 25 defined by the open ends of the first and second bundles 20 and 24 of fibers 23 (23 and 24) must be in exact alignment (equal diameters about the same center) for optimal energy transfer.

In operation, referring to FIG. 2a, light energy from a light emitting diode or laser diode 30 is transmitted through a first small core optical fiber (100 μm) 32 to the input side of a first mixing rod 34. The mixing rod 34 is a large core optical fiber (e.g., 0.06 to 3 mm). The mixing rod 34 expands the diameter of an input beam of light so that it equals the diameter of the mixing rod 34. The expanded beam is projected from the output end of the first mixing rod 34 onto the open ends of the input side of the first bundle 20 of optical fibers 23 connected to the output end of the first mixing rod 34. The first bundle 20 of optical fibers 23 transmits light energy received from the first mixing rod 34 to the output side of the first bundle 20 of optical fibers 23 terminated in the first faceplate 22.

As shown in FIG. 2b, in the preferred embodiment, the open ends of the first bundle of optical fibers 20 are supported in side-by-side relation by the first faceplate 22 in a circular pattern 25 centered around the radial axis 27. The open ends of the second bundle 24 of optical fibers 23 are supported in side-by-side relation by the second faceplate 26 in the same circular pattern 25 centered around the common radial axis 27. As the first and second faceplates 22 and 26 are mounted in face-to-face relation, centered around the common radial axis 27, the open ends of the first and second bundles 20 and 24 of optical fibers 23 supported by the first and second faceplates 22 and 26, respectively, are aligned relative to each other. This allows light energy emitted from the open ends of the first bundle 20 of fibers 23 to be received through the open ends of the second bundle 24 fibers across the small air gap 72 between the first and second faceplates 22 and 26.

Light energy received by the open ends of the second bundle 24 of optical fibers 23 supported by the second faceplate 26 is transmitted to the input end of a second mixing rod 36. The second mixing rod 36 consists of a large core optical fiber (e.g. 0.6 to 3 mm) which expands the beams of light from the individual optical fibers of the second bundle of optical fibers 24 and combines them into a single beam projected from the output end of the second mixing rod 36. This beam is received by a third receiving bundle of optical fibers 38 which transmit the light energy to a light detecting device 40 such as a phototransistor.

Energy can also be transmitted in the opposite direction. In this case, the light from a second light emitting diode or laser diode 42 is coupled to the second bundle of optical fibers 24 through a second small core optical fiber 44 and the second mixing rod 36. The light energy received by the second bundle 24 of optical fibers 23 from the second mixing rod 36 is projected from the open ends of the second bundle 24 of optical fibers 23 mounted in the second faceplate 26 across the small air gap 72 onto the open ends of the first bundle 20 of optical fibers 23 mounted in the first faceplate 22. The light energy received by the first bundle 20 of optical fibers 23 is then transmitted through the first mixing rod 34 to a fourth receiving bundle of optical fibers 48. The fourth receiving bundle of fibers transmit the light energy received from the first mixing rod 34 to a second light detector 46.

FIG. 3 is an magnified view of a section of the ring of optical fibers 23 of FIG. 2b supported by the first or second faceplate 22 or 26. Each fiber 23 has a core 50 and a cladding 54. FIG. 3 shows a set of receiving fiber cores 50a, 50b, 50c, 50d, 50e along with the overlapped cones of light 52a, 52b, 52c, 52d, 52e projected onto the receiving fibers by a set of transmitting fibers in opposing faceplate 26 or 22. In the preferred side-by-side mounting arrangement of FIG. 3, the minimum distance between the receiving fiber cores 50 is determined by the thickness of the protective cladding 54 covering each fiber optic core 50.

For the case shown in FIG. 3, where the radius of the receiving fiber core is r and the radius of the radiated light cone projected onto the receiving fiber core is 2r, the area A1 of receiving fiber core 50, the area A2 of radiated light cone 52 projected on receiving fiber core 50, and the overlapping areas A3 of adjacent radiated light cones 52 can be calculated according to the following formulas:

$$A1 = \pi r^2 \qquad [1]$$

$$A2 = 4\pi r^2 \qquad [2]$$

$$A3 = 2(4\pi r^2 \alpha/360° - 2r^2 \sin \alpha) \quad [3]$$

Where R=radius of fiber core+cladding and
$\alpha = 180 - [2\sin^{-1} R/2r]$ degrees.

The side by side placement of the optical fibers allows the overlap between the cones of light emitted from the open ends of the first bundle 20 of optical fibers 23 to be calculated for optical fibers 23 of a given core diameter and cladding thickness. This in turn allows the calculation of the average power transfer efficiency $P_e$ between the two sets of optical fibers according to the following formula.

$$P_e = A1/(A2 - A3) \times 100 \quad [4]$$

A1=Area of receiving fiber core 50;
A2=Area of radiated light cone 52 projected on receiving fiber core 50; and
A3=Overlapping area of adjacent radiated light cones 52.

The cones of light projected by the transmitting fiber cores will move across the receiving fiber cores as the first and second faceplates rotate with respect to one another (see FIG. 2b). The amount of overlap between two adjacent cones of light, such as 52b and 52c should be large enough to insure that the receiving fiber cores will always be covered with light projected from the transmitting fiber cores.

FIG. 4 provides a cross-sectional view of a first set 20 of optical fibers 23a, 23b, and 23c supported in side-by-side relation by a first faceplate 22. A second set 24 of optical fibers 23d, 23e and 23f are also supported in a side-by-side arrangement by a second faceplate 26. The open ends of the second set of fibers 24 face the open ends of the first set of optical fibers 20. This arrangement allows the first set of optical fiber cores 50 to project light across a small air gap 72 onto the open ends of the second set of optical fiber cores when the first and second faceplates 22 and 26 are in alignment with coextensive radial axes extending through the respective centers thereof.

The diameters of the cones of light projected onto the second set 24 of optical fibers 23 is dependent on the distance D between the open ends of the first and second sets of optical fibers 20 and 24. The optimal distance D may be determined analytically or empirically by those skilled in the art. The optimal distance D was determined for a fiber having a 50 μm core radius (r), a 70μm cladding radius (R), and a numerical aperture (NA) of 0.2 for a desired projected cone radius of light of 2r:

$$D = r/\tan\theta = 4.91r$$
$$= 245 \ \mu m$$

A feature of the present invention is that the side-by-side placement in a circular pattern of both sets of optical fibers permits the design of an optimal known pattern of radiated light cones. This minimizes fluctuations in the amount of light energy transferred between the two sets of optical fibers as they rotate with respect to one another and allows for an accurate prediction thereof. This is illustrated in FIGS. 5a and 5b. FIG. 5a(1) is a graph illustrating the light transmission characteristics of a typical conventional fiber optic slip ring. FIG. 5a(2) shows the random arrangement of projected light cones resulting from the random arrangement of optic fibers of a typical conventional fiber optic slip ring. FIG. 5b(1) is a graph illustrating the light transmission characteristics of the fiber optic slip ring of the present invention. FIG. 5b(2) shows the uniform arrangement of projected light cones resulting from the uniform arrangement of optic fibers of the fiber optic slip ring of the present invention.

FIG. 5a(1) shows the wide fluctuations in transmitted light energy which might be seen by a first set of optical fibers which were arranged randomly within a ring and rotated with respect to a second set of optical fibers which were also arranged randomly within a ring as illustrated in FIG. 5a(2). As shown in FIG. 5a(1), the wide fluctuations in the amount of light energy transmitted across the optical slip ring when the light source is on (logic '1') could be mistaken for transitions between a logic '1' and a logic '0'.

FIG. 5b(1) shows the improvement in noise margin afforded by the optical slip ring is of the present invention resulting from the arrangement of both first and second sets of optical fibers in a circular pattern in the close side-by-side relation illustrated in FIG. 5b(2). In addition to an increase in the total amount of light energy transmitted, fluctuations in transmitted light levels can be significantly reduced and predicted due to the overlapped light cones projected by the first set of optical fibers.

Figure 6:
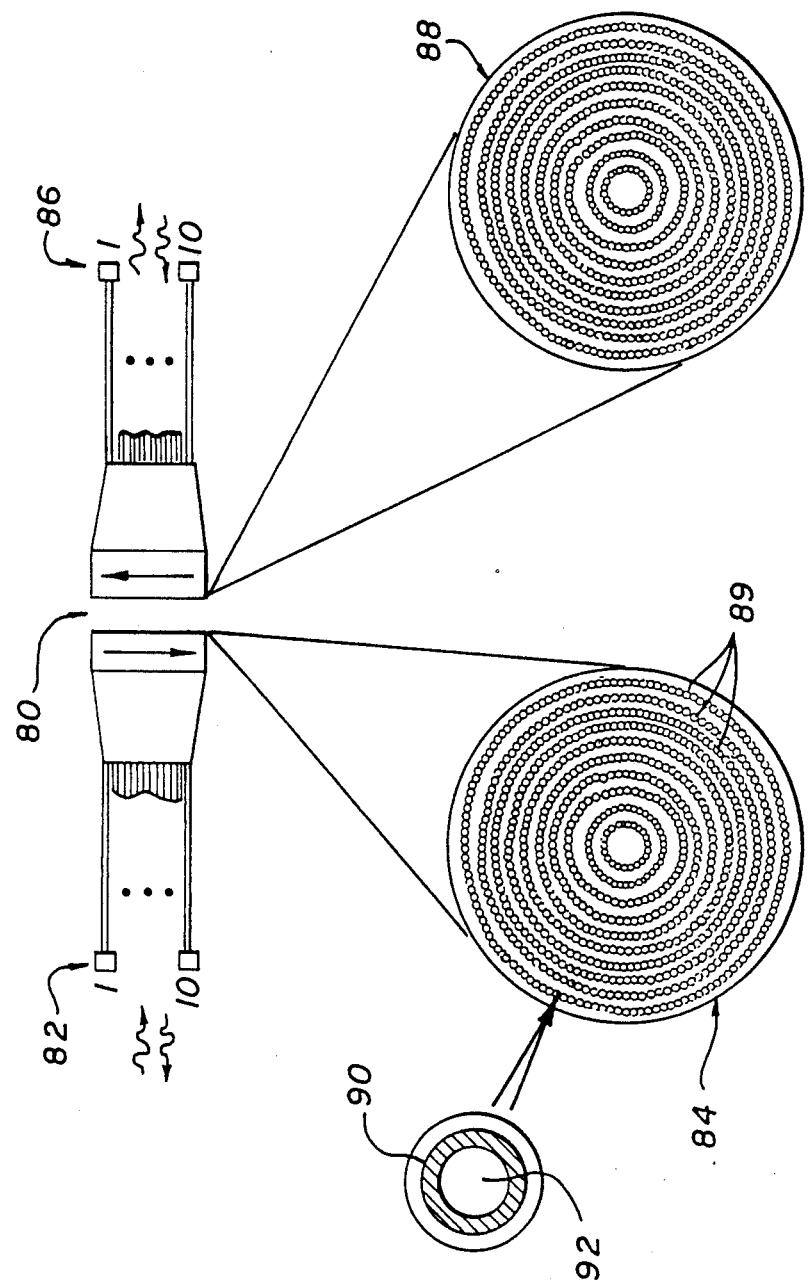
FIG. 6 illustrates a multiple channel optical slip ring constructed in accordance with the present teachings.

FIG. 6 shows an alternative embodiment of the present invention, providing an optical slip ring 80 with multiple rings 25 and hence multiple channels. The multiple channel optical slip ring 80 consists of a first set of two or more bundles of optical fibers 82 having open ends are arranged in a pattern of uniform concentric circles supported by a first faceplate 84. A second set of two or more bundles of optical fibers 86 having open ends are arranged in a pattern of uniform concentric circles supported by a second faceplate 88. Light energy is coupled from one side of the optical slip ring 84 to the other 88 with each concentric ring 89 of optical fibers acting as an independent channel.

In the preferred embodiment, both the first and second faceplates 84 and 88 and the cladding surrounding each individual fiber core 90 are constructed of a light absorbing material. This will help reduce cross talk between adjacent channels (concentric rings of fibers 89) by preventing light projected onto one channel from being reflected onto an adjacent channel.

The present invention has been described herein with reference to a particular embodiment for a particular application. Nonetheless, the invention is not limited thereto. Those of ordinary skill in the art and access to the teachings provided herein will recognize additional modifications, applications, and embodiments within the scope thereof. For example, the invention is not limited to facilitating communications between the spun and despun portions of a satellite. It may also be used in tank turrets, helicopters, aircraft and other applications using rotary joints and gimbaled sensors.

It is intended by the appended claims to cover any and all such modifications, applications, and embodiments within the scope of the invention.

Accordingly,
What is claimed is:
1. An optical slip ring comprising:

first supporting means for supporting a first plurality of optical fibers in a predetermined pattern, said first supporting means having a radial axis; and second supporting means, disposed along said radial axis, for supporting a second plurality of optical fibers in said predetermined pattern for optically communicating with said first plurality of optical fibers, said second supporting means comprising a flexible coupling joint for minimizing alignment variations between said first and second supporting means, and wherein each of said first and second plurality of optical fibers being arranged to function as a transmitting and a receiving light conductor for communicating with a light generator and a light detector.

2. The invention of claim 1 wherein said predetermined pattern is circular.

3. The invention of claim 2 wherein each of said first plurality of optical fibers are separated from each adjacent optical fiber by a uniform distance.

4. The invention of claim 2 wherein each of said second plurality of optical fibers are separated from each adjacent optical fiber by a uniform distance.

5. The invention of claim 3 wherein said first plurality of optical fibers are in side-by-side orientation.

6. The invention of claim 4 wherein said second plurality of optical fibers are in side-by-side orientation.

7. The invention of claim 3 wherein said first plurality of optical fibers are separated by a light absorbing material.

8. The invention of claim 4 wherein said second plurality of optical fibers are separated by a light absorbing material.

9. The invention of claim 3 wherein two or more pluralities of optical fibers are arranged coaxially about said radial axis to form a plurality of independent light carrying channels.

10. The invention of claim 4 wherein two or more pluralities of optical fibers are arranged coaxially about said radial axis to form a plurality of independent light carrying channels.

11. The invention of claim 1 wherein said first support means is a first faceplate.

12. The invention of claim 1 wherein said second support means is a second faceplate.

13. An optical slip ring comprising:

a first faceplate for supporting a first plurality of optical fibers in a predetermined pattern, said first faceplate having a radial axis; and a second faceplate disposed along said radial axis for supporting a second plurality of optical fibers in said predetermined pattern for optically communicating with said first plurality of optical fibers, said second faceplate communicating with a flexible coupling joint for minimizing alignment variations between said first and second faceplates, wherein each of said first and second plurality of optical fibers being arranged to function as a transmitting and receiving light conductor for communicating with a light generator and a light detector.

14. The invention of claim 13 wherein an inner housing shell in mechanical communication with said second faceplate rotates within a set of ball bearings with respect to an outer housing shell in mechanical communication with said first faceplate.

15. The invention of claim 13 wherein said first faceplate is threadedly connected to an outer housing shell.

16. The invention of claim 13 wherein said second faceplate is threadedly connected to an inner housing shell.

17. The invention of claim 13 wherein said second faceplate communicates with said flexible coupling joint through an inner housing shell.

* * * * *

UNITED STATES PATENT AND TRADEMARK OFFICE
CERTIFICATE OF CORRECTION

PATENT NO. : 4,953,932

DATED : September 4, 1990

INVENTOR(S) : Alexander Mihich

It is certified that error appears in the above-identified patent and that said Letters Patent is hereby corrected as shown below:

Title page should be deleted to appear as per attached title page.

Columns 1 - 8 should be deleted to appear as per attached columns 1 - 8.

Signed and Sealed this

Nineteenth Day of January, 1993

Attest:

DOUGLAS B. COMER

*Attesting Officer*  *Acting Commissioner of Patents and Trademarks*

United States Patent [19]

Mihich

[11] Patent Number: 4,953,932
[45] Date of Patent: Sep. 4, 1990

[54] OPTICAL SLIP RING

[75] Inventor: Alexander Mihich, Manhattan Beach, Calif.

[73] Assignee: Hughes Aircraft Company, Los Angeles, Calif.

[21] Appl. No.: 343,754

[22] Filed: Apr. 25, 1989

[51] Int. Cl.$^5$ .............................................. G02B 6/26
[52] U.S. Cl. .............................. 350/96.15; 350/96.20
[58] Field of Search ............... 350/96.15, 96.20, 96.21, 350/96.22; 250/227

[56] References Cited

U.S. PATENT DOCUMENTS

| | | | |
|---|---|---|---|
| 4,109,997 | 8/1978 | Iverson | 350/96.15 X |
| 4,466,695 | 8/1984 | Kruger | 350/96.20 |
| 4,492,427 | 1/1985 | Lewis et al. | 350/96.20 |
| 4,791,293 | 12/1988 | Barriere | 350/96.20 X |
| 4,818,860 | 4/1989 | Hasegawa | 250/227 |

FOREIGN PATENT DOCUMENTS 59-46612  3/1984  Japan ............................... 350/96.22

OTHER PUBLICATIONS

Henderson et al., "A Fiber Optic Rotational Coupler", *Electron Components Conf.* Arlington, Va. (U.S.A.), May 1977, pp. 557–560.

*Primary Examiner*—John D. Lee
*Attorney, Agent, or Firm*—Robert A. Westerlund; Steven M. Mitchell; W. K. Denson-Low

[57] ABSTRACT

An improved optical slip ring 15 is disclosed in which optical fibers are arranged in a predetermined pattern to transfer light energy from a non-rotating body to a rotating body. The optical slip ring 15 of the present invention provides a predictable correlation between position and optical coupling. The invention includes a first support 22 for securing a first plurality of optical fibers 20 arranged in a predetermined pattern around a radial axis and a second support 26 for a second plurality of optical fibers 24 arranged in a predetermined pattern around the same radial axis. In the illustrative embodiment, the first and second supports 22 and 26 are arranged so that the open end patterns of the first and second patterns of optical fibers are in face-to-face relation. Light energy transmitted through the open ends of the first plurality of optical fibers 20 is then received through the open ends of the second plurality of optical fibers 24 across a small gap 72. The arrangement of the first and second pluralities of optical fibers in a predetermined pattern provides an optimal alignment of the individual optical fibers of the first and second pluralities of optical fibers with respect to one another. This, in turn, facilitates a predictable correlation between the relative position of the first and second supports 22 and 26 and the optical coupling therebetween.

17 Claims, 4 Drawing Sheets

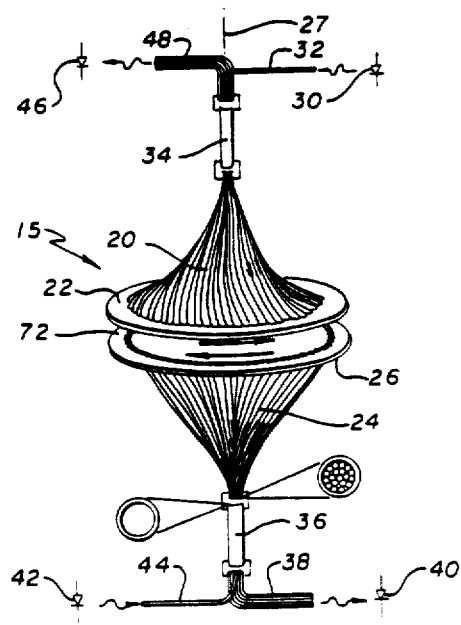

OPTICAL SLIP RING

BACKGROUND OF THE INVENTION

1. Field of the Invention

The present invention relates to slip rings for transferring signals from a rotating body to a non-rotating body. More specifically, the present invention relates to optical slip rings.

While the present invention is described herein with reference to an illustrative embodiment for a particular application, it is understood that the invention is not limited thereto. Those having ordinary skill in the art and access to the teachings provided herein will recognize additional modification, applications and embodiments within the scope of the present invention.

2. Description of the Related Art

Many applications require the transmission of electrical power or signals across rotary joints. Traditionally, this function has been accomplished with mechanical slip rings. Mechanical slip rings transfer electric current from a rotating body to a non-rotating body by means of brushes attached to one body which contact a conducting ring on the other body. Unfortunately, mechanical slip rings are subject to wear, generate electrical noise and are susceptible to electromagnetic interference such as that induced by nuclear explosion.

The recent advent of fiber optic technology has led to the creation of fiber optic slip rings which solve many of the problems associated with mechanical slip rings. In place of an electrical connection, fiber optic cables are used to transfer light energy between a rotating body and a non-rotating body. U.S. Pat. No. 4,109,997, issued to M. Iverson on Feb. 28, 1977 discloses a typical conventional fiber optic slip ring. The slip ring consists of two opposing faceplates, each containing bundles of fiber optic cables. The fiber optic cables have open ends which are formed into rings terminating on the supporting faceplates. Light energy projected from the open ends of the fiber optic cables mounted on one faceplate are received by the open ends of the optic fibers mounted on the opposing faceplate, even as the two faceplates rotate with respect to one another.

Unfortunately, the magnitude of the energy transferred between the faceplates will vary randomly as the faceplates rotate with respect to each other. As a result, the random arrangement of the fibers within the rings precludes an accurate prediction of the fluctuations in the magnitude of the energy transferred between the faceplates as a function of the relative position of the two bodies.

Accordingly, there is a need in the art for a lightweight optical fiber slip ring which affords a predictable correlation between the relative position of two counter-rotating bodies and the optical coupling therebetween.

SUMMARY OF THE INVENTION

The need in the art is addressed by the improved optical slip ring of the present invention in which optical fibers are arranged in a predetermined pattern to transfer light energy from a non-rotating body to a rotating body. The optical slip ring of the present invention provides a predictable correlation between position and optical coupling of the rotating and non-rotating bodies. The invention includes first support for a first plurality of optical fibers arranged in a predetermined pattern around a radial axis. The invention also includes a second support for a second plurality of optical fibers arranged in a predetermined pattern around the same radial axis. In the illustrative embodiment, the first and second supports are arranged so that the open ends of the first and second patterns of optical fibers are in face-to-face relation. Light energy transmitted through the open ends of the first plurality of optical fibers is then received through the open ends of the second plurality of optical fibers across a small gap. The arrangement of the first and second pluralities of optical fibers in a predetermined pattern provides an optimal alignment of the individual optical fibers of the first and second pluralities of optical fibers with respect to one another. This, in turn, facilitates a predictable correlation between the relative position of the first and second supports and the optical coupling therebetween.

BRIEF DESCRIPTION OF THE DRAWINGS

FIG. 1 is a sectional side view of an illustrative embodiment of a slip ring assembly incorporating the optical slip ring of the present invention.

FIG. 2a is a simplified perspective view which illustrates the arrangement of the optical fibers attached to the opposing faceplates of the optical slip ring of the present invention.

FIG. 2b is a simplified frontal view of the opposing faceplates which illustrates the arrangement of the optical fibers in a circular pattern centered about a common radial axis.

FIG. 3 illustrates the radiated light cones which are emitted by a first set of optical fibers and received by a second set of optical fibers.

FIG. 4 is a diagrammatic sectional side view representative of the overlapped conical rings of light projected onto the receiving fibers by the transmitting optical fibers of the optical slip ring of the present invention.

FIG. 5a(1) is a graph illustrating the light transmission characteristics of a typical conventional fiber optic slip ring.

FIG. 5a(2) shows the random arrangement of projected light cones resulting from the random arrangement of optic fibers of a typical conventional fiber optic slip ring.

FIG. 5b(1) is a graph illustrating the light transmission characteristics of the fiber optic slip ring of the present invention.

FIG. 5b(2) shows the uniform arrangement of projected light cones resulting from the uniform arrangement of optic fibers of the fiber optic slip ring of the present invention.

FIG. 6 illustrates a multiple channel optical slip ring constructed in accordance with the present teachings.

DESCRIPTION OF THE INVENTION

FIG. 1 is a sectional side view of an illustrative embodiment of a slip ring assembly 10 incorporating the optical slip ring 15 of the present invention. The optical slip ring assembly 10 couples light energy between a non-rotating (despun) section 12 and a rotating (spun) section 14 of a spin-stabilized satellite (not shown). The optical slip ring 15 of the present invention is retained within an outer housing shell 16 and an inner housing shell 18 of the assembly 10. The inner housing shell 18 rotates within the outer housing shell 16 on a set of ball bearings 13. The ball bearings 13 are retained between annular rims 17 and 21 of the outer housing shell 16 and an annular rim 19 of the inner housing shell 18.

The optical slip ring 15 includes a first bundle 20 of optical fibers 23 supported by a first faceplate 22 and a second bundle 24 of optical fibers 23 supported by a second faceplate 26. In the illustrative embodiment, the first faceplate 22 is threaded and screwed in the annular rim 17 of the outer housing shell 16. The second faceplate 26 is threaded and screwed into the annular rim 19 of the inner housing shell 18. The invention is not limited to the manner by which the faceplates are attached to the rotating bodies. Those skilled in the art will recognize additional mounting arrangements within the scope of the invention. The mounting arrangement of the faceplates is such that the first and second faceplates 22 and 26 are aligned in face-to-face relation. This arrangement allows the faceplates 22 and 26 to rotate around a common radial axis 27 extending through the respective centers thereof.

The outer housing shell 16 is attached to the despun section 12 of the satellite by adhesives, welds, screws or bolts or other suitable means. The inner housing shell 18 is attached to the spun section 14 of the satellite by a flex coupling joint 28. The flex coupling joint 28 insures that relative movement of the despun and spun sections 12 and 14 of the satellite along and outside a shared radial axis will not disturb the alignment of the first and second faceplates 22, 26. The flex coupling joint 28 can be attached to the inner housing shell 18 and the spun section of the satellite 14 with adhesives, welds, screws or bolts. Both the inner housing shell 18 and the outer housing shell 16 can be constructed of metal or other suitable material. The first and second faceplates 22, 26 can be constructed of metal, a light absorbing material such as glass or plastic, or other suitable material.

FIG. 2a is a simplified perspective view which illustrates the arrangement of the optical fibers of the opposing faceplates of the optical slip ring of the present invention. As shown in FIG. 2a, the open ends of the first bundle 20 of optical fibers 23 are terminated in the first faceplate 22 while open ends of the second bundle 24 of optical fibers 23 are terminated in the second faceplate 26.

FIG. 2b is a frontal view of the first and second faceplates 22 and 26. As shown in FIG. 2b, the open ends of both the first and second bundles 20 and 24 of optical fibers 23 are arranged in circular patterns or rings 25 of equal diameter, centered around the common radial axis 27. The circular patterns 25 defined by the open ends of the first and second bundles 20, 24 of fibers 23 must be in exact alignment (e.g., equal diameters about the same center) for optimal energy transfer.

In operation, referring to FIG. 2a, light energy from a light emitting diode or laser diode 30 is transmitted through a first small core optical fiber (100 μm) 32 to the input side of a first mixing rod 34. The mixing rod 34 is a large core optical fiber (e.g., 0.6 to .3 mm) which expands the diameter of an input beam of light so that it equals the diameter of the mixing rod 34. The expanded beam is projected from the output end of the first mixing rod 34 onto the open ends of the input side of the first bundle 20 of optical fibers 23. The input side of the optical fibers 23 are connected to the output end of the first mixing rod 34. The first bundle 20 of optical fibers 23 transmits light energy received from the first mixing rod 34 to the output side of the first bundle 20 of optical fibers 23 terminated in the first faceplate 22.

As shown in FIG. 2b, in the preferred embodiment, the open ends of the first bundle of optical fibers 20 are supported in side-by-side relation by the first faceplate 22 in a circular pattern 25 centered around the radial axis 27. The open ends of the second bundle 24 of optical fibers 23 are supported in side-by-side relation by the second faceplate 26 in the same circular pattern 25 centered around the common radial axis 27. As the first and second faceplates 22 and 26 are mounted in face-to-face relation, centered around the common radial axis 27, the open ends of the first and second bundles 20 and 24 of optical fibers 23 supported by the first and second faceplates 22 and 26, respectively, are aligned relative to each other. This allows light energy emitted from the open ends of the first bundle 20 of fibers 23 to be received through the open ends of the fibers 23 of the second bundle 24 fibers across a small air gap 72 between the first and second faceplates 22 and 26.

Light energy received by the open ends of the second bundle 24 of optical fibers 23 supported by the second faceplate 26 is transmitted to the input end of a second mixing rod 36. The second mixing rod 36 consists of a large core optical fiber (e.g. 0.6 to 3 mm) which expands the beams of light from the individual optical fibers of the second bundle of optical fibers 24 and combines them into a single beam projected from the output end of the second mixing rod 36. This beam is received by a third receiving bundle of optical fibers 38 which transmit the light energy to a light detecting device 40 such as a phototransistor.

Energy can also be transmitted in the opposite direction. In this case, the light from a second light emitting diode or laser diode 42 is coupled to the second bundle of optical fibers 24 through a second small core optical fiber 44 and the second mixing rod 36. The light energy received by the second bundle 24 of optical fibers 23 from the second mixing rod 36 is projected from the open ends of the second bundle 24 of optical fibers 23 mounted in the second faceplate 26 across the small air gap 72 onto the open ends of the first bundle 20 of optical fibers 23 mounted in the first faceplate 22. The light energy received by the first bundle 20 of optical fibers 23 is then transmitted through the first mixing rod 34 to a fourth receiving bundle of optical fibers 48. The fourth receiving bundle of fibers transmit the light energy received from the first mixing rod 34 to a second light detector 46.

FIG. 3 is a magnified view of a section of the ring of optical fibers 23 of FIG. 2b supported by the first faceplate 22 or the second faceplate 26. Each fiber 23 has a core 50 and a cladding 54. FIG. 3 shows a set of receiving fiber cores 50a, 50b, 50c, 50d, 50e along with the overlapped cones of light 52a, 52b, 52c, 52d, 52e projected onto the receiving fibers by a set of transmitting fibers in opposing faceplate 26 or 22. In the preferred side-by-side mounting arrangement of FIG. 2b, the minimum distance between the receiving fiber cores 50 is determined by the thickness of the protective cladding 54 covering each fiber optic core 50.

For the case shown in FIG. 3, where the radius of the receiving fiber core is r and the radius of the radiated light cone projected onto the receiving fiber core is 2r, the area A1 receiving fiber core 50, the area A2 of radiated light cone 52 projected onto receiving fiber core 50, and the overlapping areas A3 of adjacent radiated light cones 52 can be calculated according to the following formulas:

$$A1 = \pi r^2 \qquad [1]$$

$$A2 = 4\pi r^2 \qquad [2]$$

$$A3 = 2(4\pi r^2/360 - 2r^2 \sin \alpha) \qquad [3]$$

Where R—radius of fiber core+cladding and
$= 180 - [2 \sin^{-1}(R/2r)]$ degrees.

The side by side placement of the optical fibers allows the overlap between the cones of light emitted from the open ends of the first bundle 20 of optical fibers 23 to be calculated for optical fibers 23 of a given core diameter and cladding thickness. This, in turn, allows the calculation of the average power transfer efficiency $P_e$ between the two sets of optical fibers according to the following formula.

$$P_e = A1/(A2 - A3) \times 100 \qquad [4]$$

A1—Area of receiving fiber core 50;
A2=Area of radiated light cone 52 projected on receiving fiber core 50; and
A3=Overlapping area of adjacent radiated light cones 52.

The cones of light projected by the transmitting fiber cores will move across the receiving fiber cores as the first and second faceplates rotate with respect to one another (see FIG. 2a). The amount of overlap between two adjacent cones of light, such as 52b and 52c should be large enough to insure that the receiving fiber cores will always be covered with light projected from the transmitting fiber cores.

FIG. 4 provides the cross-sectional view of the first bundle 20 of optical fibers 23a, 23b, and 23c supported in side-by-side relation by the first faceplate 22. The second bundle 24 of optical fibers 23d, 23e and 23f are also supported in a side-by-side arrangement by the second faceplate 26. The open ends of the second bundle of fibers 24 face the open ends of the first bundle of optical fibers 20. This arrangement allows the first bundle of optical fiber cores 50 to project light across the small air gap 72 onto the open ends of the second bundle of optical fiber cores when the first and second faceplates 22 and 26 are in alignment with coextensive radial axes extending through the respective centers thereof.

The diameters of the cones of light projected onto the second bundle 24 of optical fibers 23 is dependent upon the distance D between the open ends of the first and second bundles of optical fibers 20 and 24. The optimal distance D may be determined analytically or empirically by those skilled in the art. The optimal distance D was determined for a fiber having a 50 μm core radius (r), a 70 μm cladding radius (R), and a numerical aperture (NA) of 0.2 for a desired projected cone radius of light of 2r:

$$D = r/\tan\theta = 4.91r$$
$$= 245 \mu m$$

A feature of the present invention is that the side-by-side placement in the circular pattern 25 of both bundles of optical fibers permits the design of an optimal known pattern of radiated light cones. This minimizes fluctuations in the amount of light energy transferred between the two bundles of optical fibers as they rotate with respect to one another and allows for an accurate prediction thereof. This is illustrated in FIGS. 5a and 5b. FIG. 5a(1) is a graph illustrating the light transmission characteristics of a typical conventional fiber optic slip ring. FIG. 5a(2) shows the random arrangement of projected light cones resulting from the random arrangement of optic fibers of a typical conventional fiber optic slip ring. FIG. 5b(1) is a graph illustrating the light transmission characteristics of the fiber optic slip ring of the present invention. FIG. 5b(2) shows the uniform arrangement of projected light cones resulting from the uniform arrangement of optic fibers of the fiber optic slip ring of the present invention.

FIG. 5a(1) shows the wide fluctuations in transmitted light energy which might be seen by a first bundle of optical fibers which were arranged randomly within a ring and rotated with respect to a second bundle of optical fibers which were also arranged randomly within a ring as illustrated in FIG. 5a(2). As shown in FIG. 5a(1), the wide fluctuations in the amount of light energy transmitted across the optical slip ring when the light source is on (logic '1') could be mistaken for transitions between a logic '1' and a logic '0'.

FIG. 5b(1) shows the improvement in noise margin afforded by the optical slip ring of the present invention. This improvement results from the arrangement of both first and second bundles of optical fibers in a circular pattern and in the close side-by-side relation illustrated in FIG. 5b(2). In addition to an increase in the total amount of light energy transmitted, fluctuations in transmitted light levels can be significantly reduced and predicted due to the overlapped light cones projected by the first bundle of optical fibers.

FIG. 6 shows an alternative embodiment of the present invention which provides an optical slip ring 80 with multiple circular ring patterns 25 and hence multiple channels. The multiple channel optical slip ring 80 consists of a first set of two or more bundles of optical fibers 82 having open ends arranged in a pattern of uniform concentric circles supported by a first faceplate 84. A second set of two or more bundles of optical fibers 86 having open ends are arranged in a pattern of uniform concentric circles supported by a second faceplate 88. Light energy is coupled from one side of the optical slip ring 80 at the first faceplate 84 to the second faceplate 88 with each concentric ring 80 of optical fibers acting as an independent channel.

In the alternative embodiment, both the first and second faceplates 84 and 88 and the cladding 90 surrounding each individual fiber core 92 are constructed of a light absorbing material. Such construction will help reduce cross transmission of light between adjacent channels (concentric rings 89 of optical fibers) by preventing light projected onto one channel from being reflected onto an adjacent channel.

The present invention has been described herein with reference to a particular embodiment for a particular application. Nonetheless, the invention is not limited thereto. Those of ordinary skill in the art and access to the teachings provided herein will recognize additional modifications, applications, and embodiments within the scope thereof. For example, the invention is not limited to facilitating communications between the spun and despun portions of a satellite. It may also be used in tank turrets, helicopters, aircraft and other applications using rotary joints and gimbaled sensors.

It is intended by the appended claims to cover any and all such modifications, applications, and embodiments within the scope of the invention.

Accordingly,
What is claimed is:

1. An optical slip ring comprising:
   first supporting means for supporting a first plurality of optical fibers in a predetermined pattern, said first supporting means having a radial axis; and
   second supporting means, disposed along said radial axis, for supporting a second plurality of optical fibers in said predetermined pattern for optically communicating with said first plurality of optical fibers, said second supporting means comprising a flexible coupling joint for minimizing alignment variations between said first and second supporting means, and wherein each of said first and second plurality of optical fibers being arranged to function as a transmitting and a receiving light conductor for communicating with a light generator and a light detector.
2. The invention of claim 1 wherein said predetermined pattern is circular.
3. The invention of claim 2 wherein each of said first plurality of optical fibers are separated from each adjacent optical fiber by a uniform distance.
4. The invention of claim 2 wherein each of said second plurality of optical fibers are separated from each adjacent optical fiber by a uniform distance.
5. The invention of claim 3 wherein said first plurality of optical fibers are in side-by-side orientation.
6. The invention of claim 4 wherein said second plurality of optical fibers are in side-by-side orientation.
7. The invention of claim 3 wherein said first plurality of optical fibers are separated by a light absorbing material.
8. The invention of claim 4 wherein said second plurality of optical fibers are separated by a light absorbing material.
9. The invention of claim 3 wherein two or more pluralities of optical fibers are arranged coaxially about said radial axis to form a plurality of independent light carrying channels.
10. The invention of claim 4 wherein two or more pluralities of optical fibers are arranged coaxially about said radial axis to form a plurality of independent light carrying channels.
11. The invention of claim 1 wherein said first support means is a first faceplate.
12. The invention of claim 1 wherein said second support means is a second faceplate.
13. An optical slip ring comprising:
    a first faceplate for supporting a first plurality of optical fibers in a predetermined pattern, said first faceplate having a radial axis; and
    a second faceplate disposed along said radial axis for supporting a second plurality of optical fibers in said predetermined pattern for optically communicating with said first plurality of optical fibers, said second faceplate communicating with a flexible coupling joint for minimizing alignment variations between said first and second faceplates, wherein each of said first and second plurality of optical fibers being arranged to function as a transmitting and receiving light conductor for communicating with a light generator and a light detector.
14. The invention of claim 13 wherein an inner housing shell in mechanical communication with said second faceplate rotates within a set of ball bearings with respect to an outer housing shell in mechanical communication with said first faceplate.
15. The invention of claim 13 wherein said first faceplate is threadedly connected to an outer housing shell.
16. The invention of claim 13 wherein said second faceplate is threadedly connected to an inner housing shell.
17. The invention of claim 13 wherein said second faceplate communicates with said flexible coupling joint through an inner housing shell.

* * * * *